US012425760B2

(12) United States Patent
Jiao et al.

(10) Patent No.: US 12,425,760 B2
(45) Date of Patent: Sep. 23, 2025

(54) METHOD AND DEVICE FOR DETECTING WEARING STATE OF EARPHONE, AND EARPHONE

(71) Applicant: Robert Bosch GmbH, Stuttgart (DE)

(72) Inventors: Tongtong Jiao, Shanghai (CN); Bin Du, Shanghai (CN); Chunlei Dai, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 447 days.

(21) Appl. No.: 17/920,633

(22) PCT Filed: May 12, 2021

(86) PCT No.: PCT/EP2021/062693
§ 371 (c)(1),
(2) Date: Oct. 21, 2022

(87) PCT Pub. No.: WO2021/233761
PCT Pub. Date: Nov. 25, 2021

(65) Prior Publication Data

US 2023/0147079 A1 May 11, 2023

(30) Foreign Application Priority Data

May 19, 2020 (CN) ......................... 202010423478.0

(51) Int. Cl.
*H04R 1/10* (2006.01)

(52) U.S. Cl.
CPC ....... *H04R 1/1041* (2013.01); *H04R 2460/03* (2013.01)

(58) Field of Classification Search
CPC .............. H04R 1/1041; H04R 2460/03; H04R 1/1016; H04R 29/001; H04R 1/1091; H04R 2201/10
See application file for complete search history.

(56) References Cited

U.S. PATENT DOCUMENTS

| | | | | |
|---|---|---|---|---|
| 10,491,981 B1 * | 11/2019 | Wang | .................. | H04R 1/1041 |
| 2012/0003937 A1 * | 1/2012 | Zhong | ................. | H04M 1/6066 455/41.3 |

(Continued)

FOREIGN PATENT DOCUMENTS

| | | |
|---|---|---|
| CN | 109753777 A | 5/2019 |
| TW | 201233087 A1 | 8/2012 |

OTHER PUBLICATIONS

International Search Report corresponding to PCT Application No. PCT/EP2021/062693, mailed Jul. 16, 2021 (English language document) (4 pages).

*Primary Examiner* — Christopher W Carter
(74) *Attorney, Agent, or Firm* — Maginot, Moore & Beck LLP

(57) ABSTRACT

A method and device for determining a wearing state of an earphone, and a corresponding earphone, are provided. The method includes determining that the earphone has experienced a first event on the basis of first acceleration data from the earphone. In response to the first event, determining whether the earphone has experienced a second event on the basis of first angular velocity data from the earphone, The method further includes determining the wearing state of the earphone on the basis of a determination result for the two events. In this way, it is possible to accurately determine the wearing state of the earphone while reducing power consumption.

13 Claims, 8 Drawing Sheets

(56) References Cited

U.S. PATENT DOCUMENTS

| | | | | |
|---|---|---|---|---|
| 2013/0121494 | A1* | 5/2013 | Johnston | H04R 1/1041 381/56 |
| 2014/0093088 | A1* | 4/2014 | Tachibana | H04R 1/1041 381/58 |
| 2019/0215611 | A1* | 7/2019 | Lou | G06F 1/3231 |
| 2019/0332141 | A1 | 10/2019 | Guo | |
| 2020/0007977 | A1 | 1/2020 | Gong et al. | |

* cited by examiner

2000

METHOD AND DEVICE FOR DETECTING WEARING STATE OF EARPHONE, AND EARPHONE

This application is a 35 U.S.C. § 371 National Stage Application of PCT/EP2021/062693, filed on May 12, 2021, which claims the benefit of priority to Serial No. CN 20 2010 423 478.0, filed on May 19, 2020 in China, the disclosure of which is incorporated herein by reference in its entirety.

The present disclosure relates to the technical field of electronics, in particular to the detection of a wearing state of an earphone.

BACKGROUND

Earphones are widely used in everyday life. In order to reduce the power consumption of earphones, it is desirable to enable earphones to automatically enter a low power consumption mode when not being worn by a user, and automatically return to a normal mode when being worn by the user. The detection of an earphone wearing state is of critical importance for this. Erroneous detection of the earphone wearing state will not only result in an unnecessary increase in power consumption, but might also cause trouble for the user when using the earphone.

At present, an acceleration sensor is generally used for the collection of motion data to identify a state in which an earphone has been picked up, so as to detect the earphone wearing state; when it is determined that the earphone has been picked up, it is regarded as being in a worn state, therefore the earphone is caused to enter the normal mode, otherwise it is kept in the low power consumption mode.

There is also a method in which data collected by an acceleration sensor is analysed to determine whether the earphone has been picked up, then an overall judgment of the earphone wearing state is made with reference to data collected by another sensor (e.g. a micro-motion sensor).

However, there is still a need for a way of determining the earphone wearing state more accurately.

SUMMARY

It is desirable to provide a method and device for detecting an earphone wearing state and a corresponding earphone, which are capable of determining the wearing state of the earphone more accurately.

According to one aspect, a method for determining a wearing state of an earphone is provided, comprising: determining whether the earphone has experienced a first event on the basis of first acceleration data from the earphone; in response to the first event, determining whether the earphone has experienced a second event on the basis of first angular velocity data from the earphone; and determining the wearing state of the earphone on the basis of a determination result for the two events.

According to another aspect, a device for determining a wearing state of an earphone is provided, comprising.

According to another aspect, an earphone is provided, comprising a receiving unit, for acquiring acceleration data and angular velocity data from the earphone; and a processing unit, for performing a step of the method according to the embodiments of the present disclosure.

According to another aspect, an earphone is provided, comprising: an acceleration sensor, for collecting acceleration data of the earphone; an angular velocity sensor, for collecting angular velocity data of the earphone; and the device for determining a wearing state of an earphone according to the embodiments of the present disclosure.

According to another aspect, a machine readable storage medium is provided, storing a computer program instruction which, when run, causes a computer to perform the method according to the embodiments of the present disclosure.

According to the embodiments in the various aspects of the present disclosure, the acceleration sensor and angular velocity sensor are used in combination; in particular, only when it has been determined that the earphone has experienced a first event on the basis of acceleration data sensed by the acceleration sensor, is a further determination made as to whether the earphone has experienced a second event on the basis of angular velocity data sensed by the angular velocity sensor, and the wearing state of the earphone is then judged on the basis of the determination regarding the second event. Thus, the wearing state of the earphone is determined after taking into account the respective features of acceleration data and angular velocity data corresponding to each event in the processes of putting on and taking off the earphone, so the accuracy of detection of the wearing state can be increased. The acceleration sensor can be conveniently used to analyse the orientation of the earphone, while the angular velocity sensor is more sensitive to slight movements and rotation of the earphone itself, so by combining the two sensors it is possible to determine the wearing state of the earphone more accurately. Furthermore, only when it has been determined on the basis of acceleration data that the earphone has experienced a first event, is a further determination made as to whether the earphone has experienced a second event on the basis of angular velocity data, and this makes it possible for the angular velocity sensor to be activated to determine a second event only when it has been determined that the earphone has experienced a first event. An angular velocity sensor such as a gyroscope will develop drift over a long period of use, whereas an acceleration sensor will give accurate measurements over a long period of use; thus, the fact that the angular velocity sensor is activated to determine a second event on the basis of angular velocity data only when a first event has been determined using acceleration data not only reduces power consumption but also reduces measurement error, and in turn further increases the accuracy of the earphone wearing state.

BRIEF DESCRIPTION OF THE DRAWINGS

In the drawings, embodiments are illustrated in a purely exemplary fashion, in a non-limiting way; similar reference labels in the drawings denote similar elements.

Figure 1A:
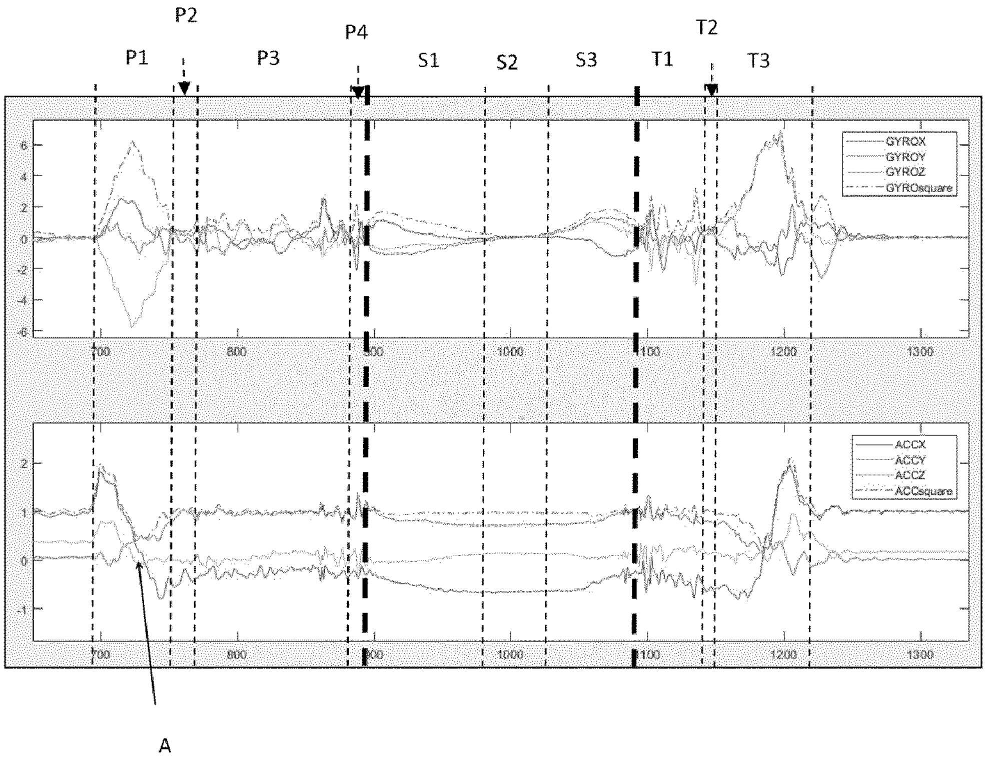
FIG. 1A shows angular velocity data and acceleration data collected using an angular velocity sensor and an acceleration sensor respectively in the entire process of a user putting on an earphone and taking off the earphone, according to one embodiment.

Various aspects and features of the embodiments of the present disclosure are described with reference to the above drawings. These drawings are merely schematic, not restrictive. The size, shape, labelling or appearance of the elements in the drawings can vary without departing from the purport of the present utility model, and are not limited to those shown in the drawings alone.

DETAILED DESCRIPTION

According to the embodiments of the present disclosure, it is recognized that in the processes of a user putting on an earphone and taking off the earphone, multiple stages (i.e. multiple events) will be passed through, each stage having specific movement characteristics, which can be reflected in acceleration data and/or angular velocity data. Based on predetermined acceleration data modes and predetermined angular velocity data modes which correspond to different events and are formed from these specific movement characteristics, it is possible to identify corresponding events in acceleration data and/or angular velocity data, and thereby identify the processes of the user putting on the earphone and taking off the earphone, so as to achieve accurate detection of the earphone wearing state.

It can be anticipated that measurement values of an acceleration sensor will be accurate over a long period of use, whereas measurement values of an angular velocity sensor will be more accurate over a short period of use, but have a larger error over a long period of use due to drift; moreover, an acceleration sensor has relatively low power consumption, whereas an angular velocity sensor has relatively high power consumption. Thus, when an acceleration sensor and an angular velocity sensor are used in combination, the acceleration sensor is used to continuously monitor events experienced by the earphone, the angular velocity sensor is activated to perform measurement only after a first event has been determined on the basis of acceleration data, and a determination is made as to whether a second event has occurred on the basis of angular velocity data. In this way, taking into account the characteristics of the acceleration sensor and the angular velocity sensor themselves, the acceleration sensor and angular velocity sensor are combined to detect specific events in the processes of putting on the earphone and taking off the earphone. This lowers the power consumption and reduces noise while increasing the accuracy of detection of the wearing state.

Figure 1B:
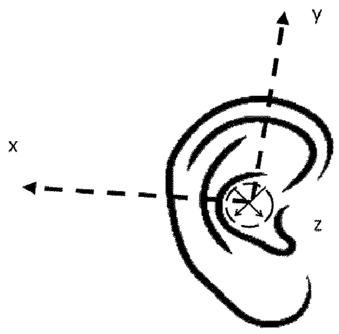
FIG. 1B shows a coordinate system of an acceleration sensor and an angular velocity sensor according to one embodiment.

FIG. 1A shows angular velocity data and acceleration data collected using an angular velocity sensor and an acceleration sensor respectively in the entire process of a user putting on an earphone and taking off the earphone, according to one embodiment. As shown in FIG. 1A, the upper figure shows angular velocity data GYROX, GYROY, GYROZ collected by a three-axis angular velocity sensor (e.g. a three-axis gyroscope), and the root of the sum of squares, GYRO-square, of three-axis angular velocity data; the lower figure shows acceleration data ACCX, ACCY, ACCZ collected by a three-axis acceleration sensor, and the root of the sum of squares, ACC square, of three-axis acceleration data. The three axes of the angular velocity sensor and acceleration sensor can be determined artificially. Here, for a right ear as shown in FIG. 1B, the z axis is defined as pointing into the ear along parallel to a line connecting the left ear and right ear of the user of the earphone; the y axis is defined as pointing to a region above the ear in the direction of the long axis of the ear, perpendicular to said line; and the x axis is defined as pointing to a region behind the ear in the direction of the short axis of the ear, perpendicular to said line. In FIG. 1A, events P1-P4 correspond to the process of the user putting on the earphone, events S1-S3 correspond to movement of the earphone in the ear as the head moves, and events T1-T3 correspond to the process of the user 5 taking off the earphone. Specifically, P1 corresponds to movement from picking up the earphone to aligning it with the ear, P2 corresponds to the movement of the earphone approaching the ear in the hand of the user, P3 corresponds to the movement of fastening the earphone to the ear and adjusting it, and P4 corresponds to movement caused by the hand leaving the earphone; S1 corresponds to the movement of the head returning to a normal position after the user has put on the earphone, S2 corresponds to everyday movement of the head while the user is wearing the earphone, and S3 corresponds to a slight rotational movement of the head before the user takes off the earphone; T1 corresponds to the movement of unfastening the earphone from the ear, T2 corresponds to the movement of causing the earphone to leave the ear, and T3 corresponds to the movement of rotating the arm and putting the earphone down.

As shown in FIG. 1A, during each event, the angular velocity data and acceleration data have their own respective characteristics; by identifying these characteristics, it is hoped to identify the processes of putting on and taking off the earphone or specific movement events in the processes of putting on and taking off the earphone, and thereby identify the wearing state of the earphone. Table 1 below shows examples of waveform characteristics of acceleration data and angular velocity data for different events.

TABLE 1

| Event | Acceleration waveform characteristics | Angular velocity data waveform characteristics |
|---|---|---|
| P1 | There is a single relative change in amplitude between acceleration data of different axes, and the change in direction angle calculated on the basis of acceleration data is large. In most cases, there will be a single crossover between acceleration data of different axes. As shown by arrow A in FIG. 1. | The z axis angular velocity data output is negative, and the amplitude thereof first decreases and then increases; The length of time for which the amplitude of GYROZ is continuously greater than a predetermined value is more than a predetermined time. |
| P2 | The acceleration data is relatively stable, manifested as multiple small sharp peaks | The angular velocity data is likewise relatively stable, and the relative variation is not large The GYROsquare amplitude and standard deviation variation are both not large |

TABLE 1-continued

| Event | Acceleration waveform characteristics | Angular velocity data waveform characteristics |
|---|---|---|
| P3 | The acceleration data is relatively stable, manifested as multiple small sharp peaks. | Relative to P2, the range of variation of angular velocity data is larger; in particular, the amplitude and standard deviation thereof are both larger than the corresponding values in the P2 period. For example, the standard deviation of GYROsquare is more than 2 times the standard deviation of GYROsquare during event P2. |
| P4 | There are just a few sharp peaks | The GYROX signal exhibits oscillation, and the peaks thereof decay gradually; the rate of decay between adjacent peaks can be greater than a predetermined value of 2 for example; the frequency of oscillation is within a predetermined range, e.g. within a range of 10 Hz-30 Hz |
| S1 | A certain change takes place in orientation | The GYROX waveform amplitude gradually decays; The rotation angle along each axis changes. |
| S3 | A certain change takes place in orientation | The rotation angle along each axis changes. |
| T1 | The acceleration data is relatively stable, exhibited as multiple small sharp peaks. | The GYROsquare amplitude and standard deviation exhibit change, e.g. 1 rad/s; the standard deviation of GYROsquare is in particular more than 2 times the standard deviation of GYROsquare during event T2. |
| T2 | The acceleration data is relatively stable, exhibited as multiple small sharp peaks. | The angular velocity data is likewise relatively stable, with small GYROsquare amplitude and standard deviation variation. |
| T3 | There is a single relative change in amplitude between acceleration data of different axes, and the change in direction angle calculated on the basis of acceleration data exceeds a certain range. In most cases, there will be a single crossover between acceleration data of different axes. | The z axis angular velocity data output is positive, and the amplitude thereof first increases and then decreases; the length of time for which the amplitude of GYROZ is continuously greater than a predetermined value is more than a predetermined time. |

As will be understood, the waveform characteristics set out in Table 1 above are merely exemplary, without being restrictive or exhaustive. Those skilled in the art could add other characteristics, e.g. for the duration of different events or the duration, range and frequency of a specific waveform, etc. In addition, the values set out in Table 1 above are not restrictive; these values can vary for different users, and varying values can be set by technical personnel according to specific scenarios and users. Predetermined acceleration data modes and predetermined angular velocity data modes corresponding to different events can be generated for waveform characteristics of acceleration data and angular velocity data of different events. The predetermined acceleration data modes and predetermined angular velocity data modes can be compared with the collected acceleration data and angular velocity data, in order to determine whether a corresponding event has taken place.

Figure 2:
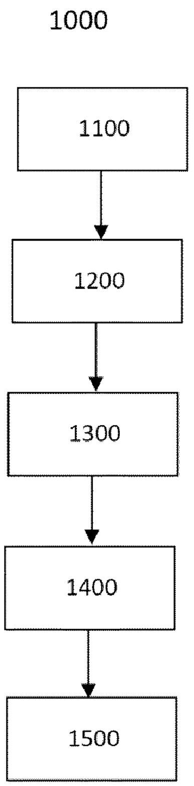
FIG. 2 shows a method for determining a wearing state of an earphone according to one embodiment.

FIG. 2 shows a method 1000 for determining a wearing state of an earphone according to one embodiment. According to the method, in step 1100, acceleration data from an acceleration sensor, in particular a three-axis acceleration sensor, disposed on or in the earphone is received as first acceleration data. The acceleration sensor can perform monitoring continuously. In some embodiments, at this time, the acceleration sensor may be in a low power consumption state, and collect acceleration data at a relatively low first data collection frequency. At the same time, an angular velocity sensor, in particular a three-axis gyroscope, disposed on or in the earphone can be in a sleep or low power consumption state.

In step 1200, based on the first acceleration data, a determination is made as to whether the earphone has experienced a first event. In one embodiment, the first event may comprise any one or more of events P1-P3, T1-T2 and S3 above. A first event used to determine whether the earphone is in a worn state may be different from a first event used to determine whether the earphone is in an unworn state, but of course, it may be anticipated that they are the same. The first acceleration data is compared with a predetermined acceleration data mode corresponding to a first event, i.e. any one or more of the abovementioned events, to determine whether the earphone has experienced a first event. The predetermined acceleration data mode is generated according to an acceleration data waveform characteristic of a corresponding event, and can be defined as a predetermined time, amplitude and/or orientation characteristic of acceleration data corresponding to a specific event. The predetermined time, amplitude and/or orientation characteristic can be set by technical personnel as required or for different objects. If the first acceleration data conforms to a particular predetermined acceleration data mode, then it is determined that the earphone has experienced a first event corresponding to the predetermined acceleration data mode. When the first event comprises more than one of P1-P3, T1-T2 and S3, characteristics of corresponding events can be integrated to generate a predetermined acceleration data model, and the collected acceleration data is compared with the predetermined acceleration data model to determine whether the earphone has experienced the first event. In one embodiment, in the case where the first event comprises multiple events in P1-P3, T1-T2 and S3, when the multiple events comprised in the first event are detected, the acceleration sensor can be restored from the low power consumption state to a normal operating state in which acceleration data is collected at a relatively high second data collection frequency. In another embodiment, it is also possible for the acceleration sensor to be restored to the normal operating state from the low power consumption state when one or more of the multiple events comprised in the first event is/are detected.

In another embodiment, the first event may comprise a movement event corresponding to picking up the earphone. Unlike the events listed in Table 1 above, the movement event of picking up the earphone can be determined by monitoring the amplitude of acceleration data. Thus, the amplitude of acceleration data can be compared with a predetermined threshold to determine whether the earphone has experienced a first event. Optionally, the orientation of acceleration data can also be taken into account. It will be understood that in this embodiment, corresponding to the process of putting on the earphone, the movement event of the user picking up the earphone can take place at an early stage in the process of event P1, and corresponding to the process of taking off the earphone, the movement event of the user picking up the earphone can take place in the process of event S3.

In step 1300, in response to the first event, angular velocity data from an angular velocity sensor, in particular a three-axis gyroscope, disposed on or in the earphone is received as first angular velocity data. Preferably, prior to this, the angular velocity sensor has been in an idle or low power consumption state, and returns to a normal state only in response to the determination that the earphone has experienced a first event, in order to collect first angular velocity data.

In step 1400, based on the first angular velocity data received, a determination is made as to whether the earphone has experienced a second event. The second event may comprise any one or more of multiple events as listed in Table 1 above, and in particular, the second event can take place after the first event. By comparing the first angular velocity data with a predetermined angular velocity data mode corresponding to a second event, it is possible to determine whether the earphone has experienced a second event; the predetermined angular velocity data mode is generated according to a waveform characteristic of angular velocity data of a corresponding event, and can be defined as a predetermined time, amplitude and/or orientation characteristic of angular velocity data corresponding to a specific event. The predetermined time, amplitude and/or orientation characteristic can be set by technical personnel as required or for different objects. If the first angular velocity data conforms to a particular predetermined angular velocity data mode, then it is determined that the earphone has experienced a second event corresponding to the predetermined angular velocity data mode. When the second event comprises multiple events listed in Table 1, characteristics of corresponding events can be integrated to generate a predetermined angular velocity data model. It will be understood that the second events may be different for different first events. In addition, a second event used to determine whether the earphone is in a worn state may be different from a second event used to determine whether the earphone is in an unworn state.

Next, based on the determination result relating to the second event in step 1400, a wearing state of the earphone is determined. Specifically, in step 1500, the wearing state of the earphone is determined on the basis of the determination that the earphone has experienced or not experienced a second event, respectively. The wearing state of the earphone may be a worn state or an unworn state. Specifically, if it is determined that the earphone has not experienced a second event, then in step 1500, then an original wearing state of the earphone is kept unchanged. If it is determined that the earphone has experienced a second event, then in step 1500, it is further determined that the earphone has changed its wearing state. In a preferred embodiment, an initial wearing state of the earphone can also be taken into account to determine the wearing state of the earphone. However, this is not restrictive, and it is also possible to determine the wearing state of the earphone from the chronological order of the first event and second event; for example, in the process of putting on the earphone, event P1 is detected first and only then are events P2 and P3 detected, and in the process of taking off the earphone, events T1 and T2 are detected first and only then will event T3 be detected. As shown in FIG. 1A, the waveform characteristics of event P1 and event T3 correspond to each other, the waveform characteristics of event P2 and event T2 correspond to each other, and the waveform characteristics of event P3 and event T1 correspond to each other. It is thereby possible to determine that the earphone is in a worn state if it is determined in step 1200 that the earphone has experienced event P1 (i.e. a first event) and determined in step 1400 that the earphone has experienced events P2 and P3 (i.e. a second event); conversely, if it is determined in step 1200 that the earphone has experienced event T1 (i.e. a first event) and determined in step 1400 that the earphone has experienced events T2 and T3 (i.e. a second event), then it is determined that the earphone is in an unworn state.

As can be seen from the embodiments described above, the second event takes place after the first event, and they can each comprise one or more events. In one embodiment, the first event is a movement event indicating that the user is picking up the earphone; as stated above, this can be judged by comparing the amplitude of acceleration data with a predetermined threshold. In this case, the second event may comprise any one or more of events P1-P4 and T1-T3 above; preferably, the second event may further comprise any one or more of events S1-S3 above, to assist in determining the wearing state.

In another embodiment, for the determination of a state in which the earphone has been put on, the first event may comprise any one or more of events P1-P3, and the second event may at least comprise event P4. In a preferred embodiment, the first event is event P3, and the second event is event P4. In addition, event S1 can also be integrated in the second event, to assist in determining the wearing state.

In another embodiment, for the determination of a state in which the earphone has been taken off, the first event may comprise any one or more of event S3 and events T1-T2, and the second event may at least comprise event T3.

In one embodiment, for the determination of the state in which the earphone has been put on and the state in which the earphone has been taken off, the same first event can be used, e.g. the abovementioned movement event of picking up the earphone. In this case, for the state in which the earphone has been put on and the state in which the earphone has been taken off, the second event may respectively comprise P1-P4 and T1-T3, or a portion of the events in P1-P4 and T1-T3.

The examples given above with regard to the first event and second event are not restrictive; it is only necessary for the second event to take place after the first event, and the first event and second event to each be specific events capable of characterizing the processes of the earphone being put on and the earphone being taken off.

Figure 3:
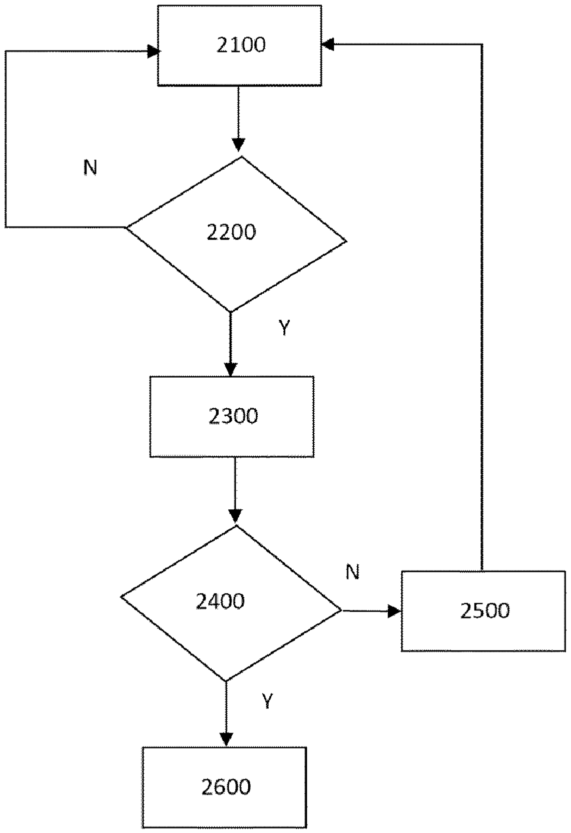
FIG. 3 shows a method for determining a wearing state of an earphone according to another embodiment.

FIG. 3 shows a method 2000 for determining a wearing state of an earphone according to a further embodiment. The method 2000 is described below by referring to the case where the first event comprises event P3 and the second event comprises event P4.

In step 2100, as in step 1100, first acceleration data is received from an acceleration sensor. In step 2200, the first acceleration data is compared with a predetermined acceleration data mode corresponding to event P3; if it does not conform thereto, then the method returns to step 2100 to receive further first acceleration data, otherwise the method advances to step 2300; in step 2300, as in step 1300, first angular velocity data, within a predetermined time for example, is received from an angular velocity sensor. In step 2400, the received first angular velocity data is compared with a predetermined angular velocity data mode corresponding to event P4; if it does not conform thereto, then in step 2500 it is determined that the wearing state of the earphone has not changed, and the method returns to step 2100 to continue to receive further first acceleration data; otherwise, in step 2600 it is determined that the wearing state of the earphone has changed, i.e. changed from an unworn state to a worn state.

Figure 4A:
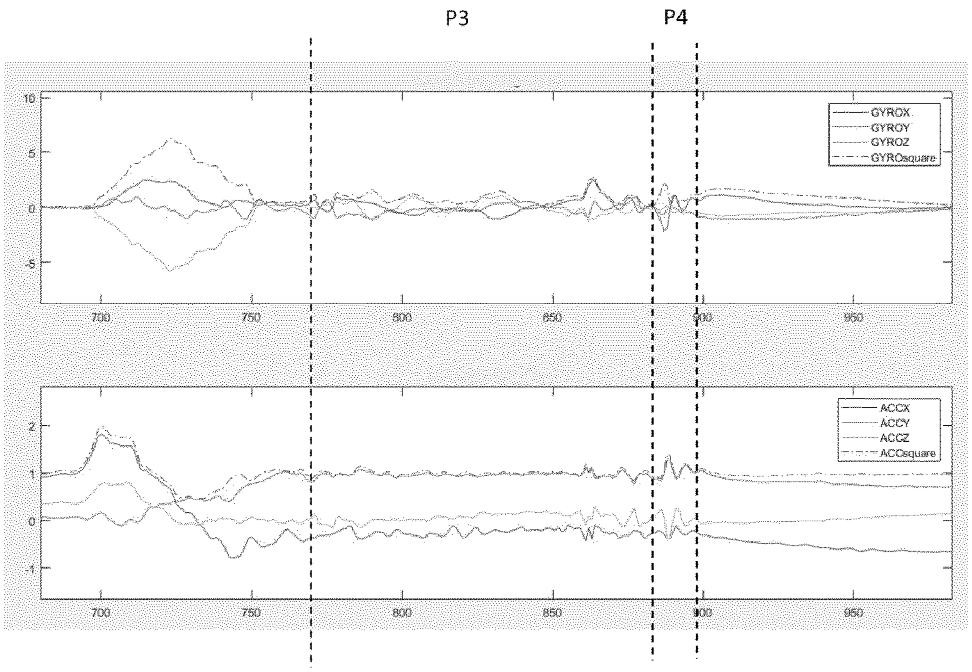
FIG. 4A shows angular velocity data and acceleration data collected using an angular velocity sensor and an acceleration sensor respectively in the process of a user putting on an earphone, according to one embodiment.
Figure 4B:
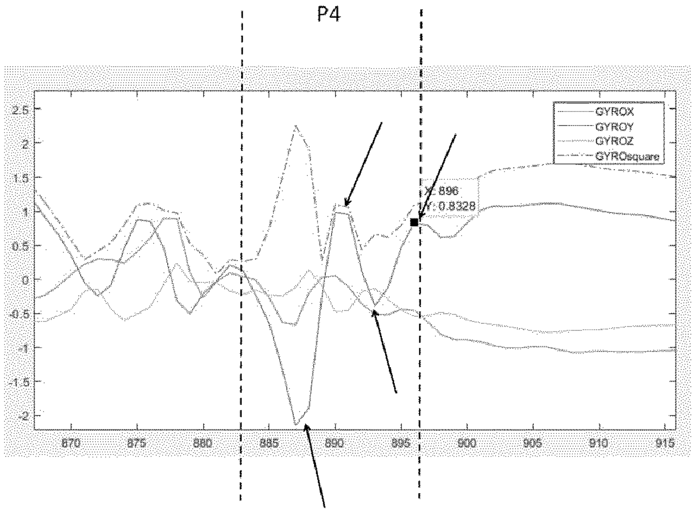
FIG. 4B shows a detailed enlarged diagram of angular velocity data shown in FIG. 4A.

FIG. 4A shows the angular velocity data and acceleration data shown in FIG. 1A which was collected using an angular velocity sensor and an acceleration sensor respectively in the process of a user putting on an earphone, according to one embodiment. FIG. 4B shows a detailed enlarged diagram of the angular velocity data corresponding to event P4. As shown in FIGS. 4A and 4B, P3 and P4 have notable characteristics, which are as listed in Table 1 above. The arrows in FIG. 4B indicate gradually decaying amplitudes. By using acceleration data to determine P3 and then using angular velocity data to determine P4, it is possible to accurately determine whether the earphone is in a worn state.

A preferred embodiment of the present disclosure has been described above with reference to events P3 and P4 for the purpose of determining that the earphone has been put on, and is thus in a worn state, but this is not restrictive; it is also possible to use other events to determine the worn state of the earphone, wherein events P3 and P4 can be replaced by a first event and a second event. In addition, the procedure shown in FIG. 3 can also be used to determine the unworn state of the earphone. For example, a first event comprising event T1 and a second event comprising event T3 are used to determine that the earphone has been taken off the ear, and is thus in the unworn state.

Various embodiments have been described above by referring to the case where a second event is determined on the basis of angular velocity data after determining a first event on the basis of acceleration data. It can also be envisaged that after a first event has been determined on the basis of acceleration data, not only is a second event determined on the basis of first angular velocity data but a third event is also determined on the basis of second acceleration data, so as to determine the wearing state of the earphone. In this embodiment, in response to the first event, a further determination is made as to whether the earphone has experienced the third event on the basis of second acceleration data from the earphone, and the wearing state of the earphone is determined on the basis of determination results for the second event and third event. The third event similarly takes place after the first event, and may be the same as, or different from, the second event.

In one embodiment, the first event is a movement event indicating that the user is picking up the earphone, and the third event may comprise any one or more of events P1-P4 and T1-T3 above; preferably, the third event may also comprise any one or more of events S1-S3 above, to assist in determining the wearing state.

In a preferred embodiment, for the determination that the earphone has been put on, the first event is a movement event indicating that the user is picking up the earphone, and this can be determined by comparing the amplitude of acceleration data with a predetermined threshold; the second event and third event are both event P1 above.

In a further preferred embodiment, for the determination that the earphone has been taken off, the first event at least comprises T1, and the second event and third event at least comprise event T3.

Figure 5:
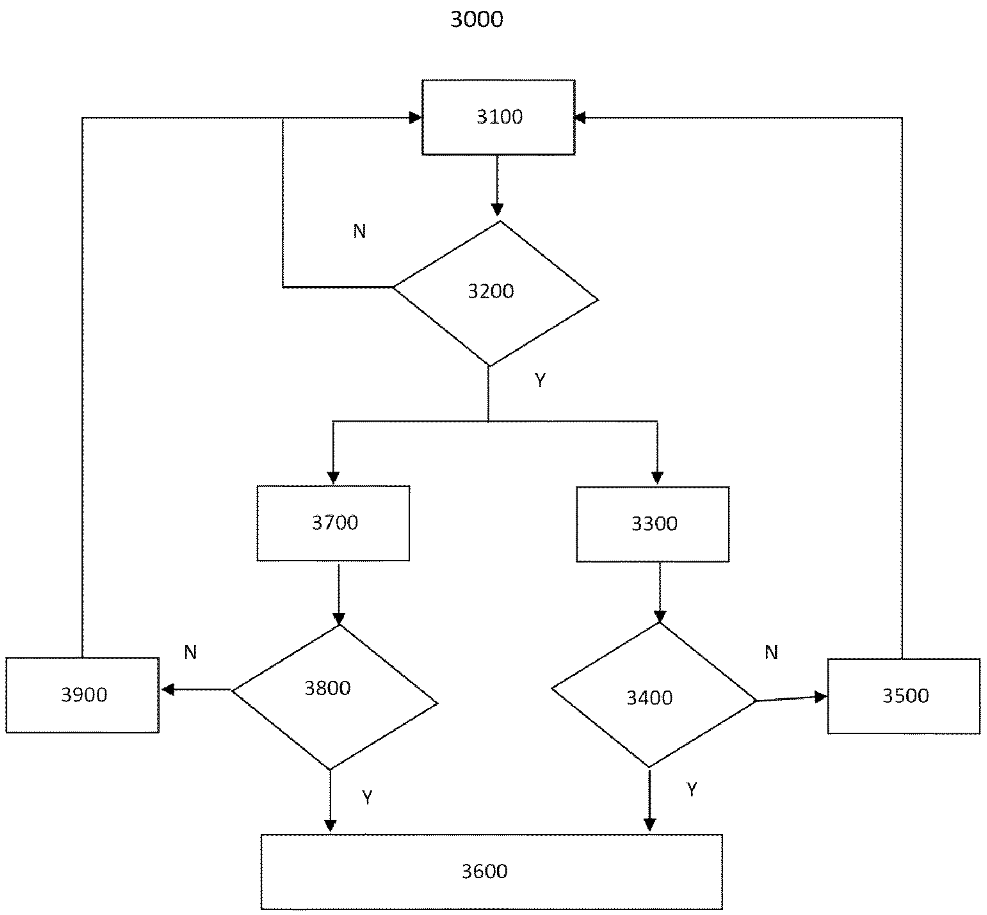
FIG. 5 shows a method for determining a wearing state of an earphone according to another embodiment.

FIG. 5 shows a method 3000 for determining a wearing state of an earphone according to this embodiment. According to the method 3000, the processing in steps 3100-3500 is the same as the processing in steps 2100-2500 shown in FIG. 3. The difference is that once it has been determined in step 3200 that a first event has taken place on the basis of first acceleration data, in addition to receiving first angular velocity data in step 3300, second acceleration data is also received in step 3700; the second acceleration data is collected after the first acceleration data.

In step 3800, the second acceleration data is compared with a predetermined acceleration data mode corresponding to a third event; if it does not conform thereto, then in step 3900 it is determined that the earphone has stayed in an original state, and the method returns to step 3100 to continue to receive first acceleration data; otherwise, the method advances to step 3600.

In step 3600, it is determined that the wearing state of the earphone has changed, in order to further determine the current wearing state of the earphone. This can be determined by taking into account the original state of the earphone and the relationship between the first and second/third events.

Figure 6A:
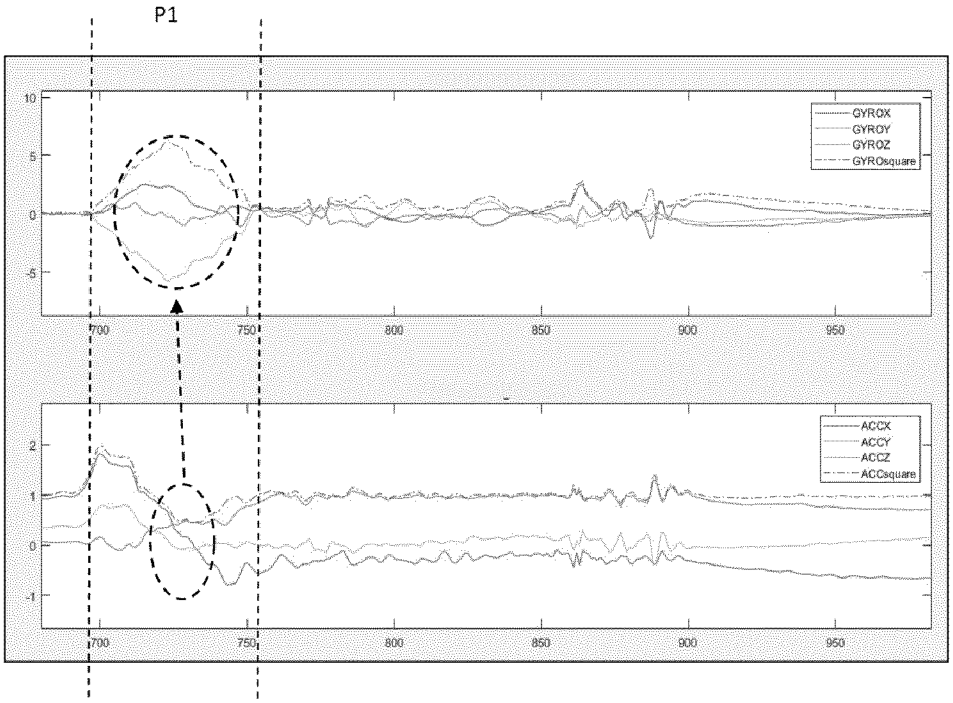
FIG. 6A shows angular velocity data and acceleration data collected using an angular velocity sensor and an acceleration sensor respectively in the process of a user putting on an earphone, according to one embodiment.

FIG. 6A shows the angular velocity data and acceleration data shown in FIG. 1 which was collected using an angular velocity sensor and an acceleration sensor respectively in the process of a user putting on an earphone, according to one embodiment. As shown in the figure, the acceleration data and angular velocity data corresponding to event P1 have obvious characteristics; in particular, the acceleration data characterizes obvious changes in the direction/attitude of the earphone, e.g. the change in direction angle calculated on the basis of the acceleration data exceeds a certain amplitude, which can be set artificially according to experience, and in a further possible situation, there is also a single crossover between acceleration data of different axes; moreover, the angular velocity data along the z axis decreases first and then increases, to represent rotation of the earphone driven by the arm. In a preferred embodiment, a first event is a movement event indicating that the user is picking up the earphone, and second and third events each comprise event P1. By comparing first angular velocity data and second acceleration data with a predetermined angular velocity data mode and a predetermined acceleration data mode corresponding to event P1 respectively, it is possible to determine whether the earphone has experienced event P1 on the basis of acceleration data and angular velocity data respectively, and in turn determine, as shown in FIG. 5, that the wearing state of the earphone has changed, i.e. changed to the worn state.

Figure 6B:
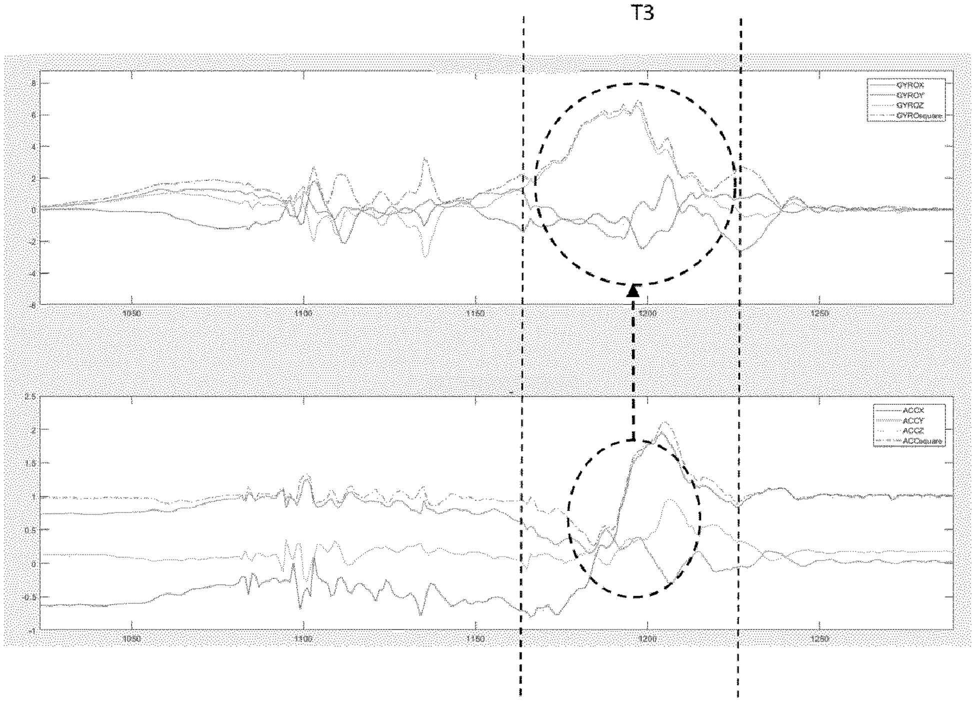
FIG. 6B shows angular velocity data and acceleration data collected using an angular velocity sensor and an acceleration sensor respectively in the process of a user taking off an earphone, according to one embodiment.

FIG. 6B shows the angular velocity data and acceleration data shown in FIG. 1 which was collected using an angular velocity sensor and an acceleration sensor respectively in the process of a user taking off an earphone, according to one 5 embodiment. As shown in the figure, the acceleration data and angular velocity data corresponding to event T3 have obvious characteristics; in particular, the acceleration data characterizes obvious changes in the direction/attitude of the earphone, e.g. the change in direction angle calculated on the basis of the acceleration data exceeds a certain amplitude, which can be set artificially according to experience, and in a further possible situation, there is also a single crossover between acceleration data of different axes; moreover, the angular velocity data along the z axis increases first and then decreases, to represent rotation of the earphone propelled by the arm. In a preferred embodiment, a first event comprises event T1, and second and third events each comprise event T3. By comparing first angular velocity data and second acceleration data with a predetermined angular velocity data mode and a predetermined acceleration data mode corresponding to event T3 respectively, it is possible to determine whether the earphone has experienced event T3 on the basis of acceleration data and angular velocity data respectively, and in turn determine, as shown in FIG. 5, that the wearing state of the earphone has changed, i.e. changed to the unworn state. A scenario could also be anticipated in which a first event comprises event T2 or a movement event indicating that the user is picking up the earphone, and second and third events comprise event T3.

By determining the specific events P1 and T3 on the basis of acceleration data and angular velocity data respectively, it is possible to more accurately determine that the earphone is in the worn state. A description has been given above by referring to the case where the second event and third event are the same event, but it could also be anticipated that they are different events.

The methods of various embodiments have been described above with reference to FIGS. 1-6, but it will be understood that the processing steps of different embodiments could be partially combined to obtain better results, and furthermore, the processing steps could be altered, split or combined to achieve anticipated objectives, as long as the spirit of the present disclosure is not departed from.

Although different embodiments have been described above by referring to the case where a first event and/or third event is/are determined on the basis of acceleration data, and a second event is determined on the basis of angular velocity data, it could also be envisaged that there is also a fourth event. In response to the second event, a further determination is made as to whether the earphone has experienced the fourth event on the basis of second angular velocity data, and the wearing state of the earphone is finally determined on the basis of the determination result for the fourth event.

For example, for the process of the earphone being put on, event P4 and event S1 can be combined to determine that the earphone is in the worn state, thus the second event comprises event P4, and the fourth event comprises event S1. Alternatively, P3-P4 and S1 can be combined to determine that the earphone is in the worn state, thus the second event can comprise events P3-P4, and the fourth event can comprise event S1. Those skilled in the art can combine events P1-P4, S1-S3 and T1-T3 in any way according to different needs and users, in order to form the first event, second event, third event and fourth event.

In a further embodiment, in addition to the acceleration sensor and angular velocity sensor, it is also possible to provide a proximity sensor such as an optical sensor in the earphone, and thereby collect proximity data for the earphone and the user's skin. Collected proximity data can be received in response to the first event and/or the second event and/or the third event and/or the fourth event, in order to further determine the wearing state of the earphone on the basis of the proximity data. When the optical sensor is blocked by the hand for example, a judgment of the wearing state of the earphone that is based solely on measurement data of the optical sensor will be inaccurate, but the optical sensor can be combined with the acceleration sensor and angular velocity sensor, to further improve the accuracy of determination of the wearing state of the earphone.

Figure 7:
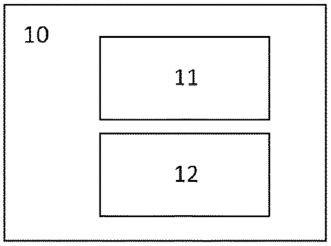
FIG. 7 shows a device for determining a wearing state of an earphone according to one embodiment.

FIG. 7 shows a device 10 for determining a wearing state of an earphone according to one embodiment. The device 10 comprises a receiving unit 11, configured to receive sensor data from a sensor of the earphone, in particular first and second acceleration data and first and second angular velocity data. The receiving unit can receive data in a wired or wireless fashion. As in the methods described above with reference to FIGS. 2, 3 and 5, the receiving unit 11 can be configured to receive acceleration data in accordance with the processing in steps 1100, 2100, 3100 and 3700 above, or receive angular velocity data in accordance with the processing in steps 1300, 2300 and 3300 above.

The device 10 further comprises a processing unit 12, configured to perform further processing of the acceleration data and angular velocity data, such as the processing steps described above with reference to FIGS. 2, 3 and 5 other than steps 1100, 2100, 3100, 1300, 2300, 3300 and 3700. All functions of the processing unit 12 can generally be realized by a microcontroller unit of the earphone.

Although only one processing unit 12 is shown, it can also be envisaged that the processing unit 12 is split into multiple processing units for the abovementioned processing steps shown with reference to FIGS. 2, 3 and 5, with some of the processing units being kept in a lower power consumption mode, and switched to a normal mode only when necessary.

The device 10 for determining a wearing state of an earphone can be integrated in the earphone, as shown below with reference to FIG. 8, but can also be disposed outside the earphone, e.g. configured as a cloud device, or integrated in a near-end device separate from the earphone.

Figure 8:
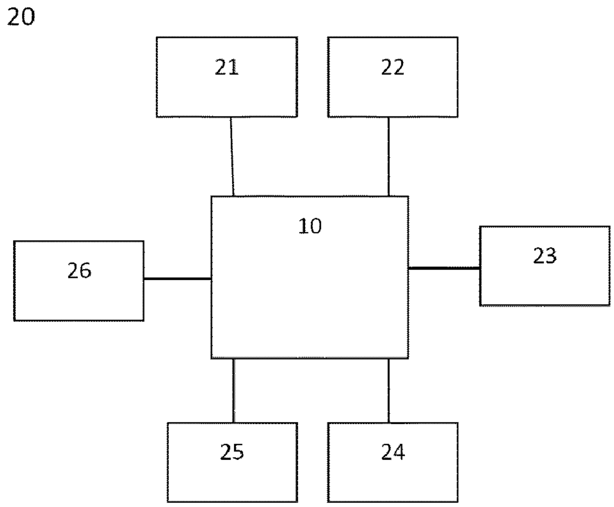
FIG. 8 shows an earphone according to one embodiment.

FIG. 8 shows an earphone 20 according to one embodiment, which employs the device 10 for determining a wearing state of an earphone in the embodiments of the present disclosure.

In addition to the device 10 for determining a wearing state of an earphone, the earphone 20 further comprises an acceleration sensor 21, for collecting acceleration data of the earphone; an angular velocity sensor 22, for collecting angular velocity data of the earphone; a loudspeaker 23, for converting electrical signals to sound signals for playing to the user; a microphone 24, for converting sound signals from the user to electrical signals; a Bluetooth device 25; and a battery device 26, for supplying power to the components of the earphone.

In the earphone 20 as shown in FIG. 8, the acceleration sensor 21 can be configured to continuously collect acceleration data, i.e. first acceleration data and second acceleration data; the processing unit 12 in the device 10 determines whether the earphone has experienced a first event according to the first acceleration data, and if it determines that a first event has been experienced, sends an interrupt signal to a control unit of the earphone (not shown); the control unit can activate or control the angular velocity sensor to collect first angular velocity data, thereby enabling the processing unit 12 to determine whether the earphone has experienced a second event according to the first angular velocity data, and determine the wearing state of the earphone on the basis of the determination result for the second event. If it is determined that the earphone is in the worn state, the control unit will activate the components of the earphone so that they enter a normal operating mode; otherwise, if it is determined that the earphone is in the unworn state, the control unit will cause the components of the earphone to enter a low power consumption mode, or even a non-operational mode, in order to reduce energy consumption. With regard to the control unit that is not shown in FIG. 8, it can be anticipated that the device 10 and the control unit are both part of the microcontroller unit of the earphone. Although only the acceleration sensor and the angular velocity sensor are shown in FIG. 8, the presence of another sensor is not ruled out, e.g. a proximity sensor and/or temperature sensor to sense other sensor data for the purpose of making a comprehensive judgment of the wearing state.

The control unit can likewise be in a low power consumption mode (or non-operational mode), and be activated to an operational mode by receiving an interrupt signal from the processing unit 12 when a first event is sensed from acceleration sensor data.

In one embodiment, it is only necessary to keep the acceleration sensor and corresponding processing unit in an operational mode, including keeping the acceleration sensor in a state of performing collection at a low collection frequency, and the corresponding processing unit must be kept in a low power consumption mode which ensures that corresponding acceleration data can be processed. When it is detected that the earphone has experienced a first event, the processing unit returns to a normal operating mode, and the angular velocity sensor is caused to enter a normal operating mode by means of the control unit; once it has been determined that the earphone has experienced a second event with reference to data of the angular velocity sensor, it is thereby determined that the wearing state of the earphone has changed, and the control unit can cause the operating state of the components of the earphone to change correspondingly, e.g. switch to a low power consumption mode or normal operating mode.

It will be understood that the method and device for determining a wearing state of an earphone in the embodiments of the present disclosure can be realized by a computer program/software. This software can be loaded into a working memory of a data processor, and is configured, when run, to perform the method according to the embodiments of the present disclosure.

Demonstrative embodiments of the present disclosure cover the following two scenarios: creating/using the computer program/software of the present disclosure from the start, and switching an existing program/software to use the computer program/software of the present disclosure by means of an update.

According to another embodiment of the present disclosure, a machine (e.g. computer) readable medium is provided, e.g. a CD-ROM, wherein the readable medium has computer program code stored thereon which, when executed, causes a computer or processor to perform the method according to the embodiments of the present disclosure. The machine readable medium is for example an optical storage medium or solid state medium that is supplied together with other hardware or as part of other hardware.

A computer program for performing the method according to the embodiments of the present disclosure can also be issued in another form, e.g. via the internet or another wired or wireless telecommunication system.

The computer program can also be provided on a network such as the world wide web, and can be downloaded from such a network into a working computer of a data processor.

It must be pointed out that the embodiments of the present disclosure are described with reference to different subject matters. In particular, some embodiments are described with reference to method-type claims, whereas other embodiments are described with reference to device-type claims. However, those skilled in the art will realize from the descriptions above and below that unless otherwise stated, besides any combination of features of subject matter of one type, any combination of features relating to different subject matters is also regarded as having been disclosed by the present application. Moreover, all features can be combined to provide a synergistic effect greater than the simple sum of features.

Specific embodiments of the present disclosure have been described above. Other embodiments lie within the scope of the attached claims. In some cases, actions or steps recorded in the claims can be performed in a different order from that in the embodiments, and still be able to achieve the desired result. Furthermore, the processes depicted in the drawings do not necessarily require the specific sequence or consecutive sequence shown in order to achieve the desired result. In some embodiments, multi-task processing and parallel processing are also possible, or might be advantageous.

The present disclosure has been described above with reference to specific embodiments, but those skilled in the art will understand that the technical solution of the present disclosure can be realized in various ways, without departing from the spirit and basic features of the present disclosure. Particular embodiments are merely schematic, not restrictive. Furthermore, these embodiments can be combined arbitrarily to achieve the objective of the present disclosure. The scope of protection of the present disclosure is defined by the attached claims.

The word "comprises" herein and in the claims does not rule out the existence of other elements or steps; expressions such as "first" and "second" do not indicate order, and do not define quantity. The functions of the elements described herein or recorded in the claims can also be split or combined, and realized by multiple corresponding elements or a single corresponding element.

The invention claimed is:

1. A method for determining a wearing state of an earphone, comprising:

determining that the earphone has experienced a first event based on first acceleration data from the earphone;

in response to the determined first event, determining whether the earphone has experienced a second event based on first angular velocity data from the earphone; and determining the wearing state of the earphone based on a determination result for the two events, wherein the wearing state includes a worn state of the earphone and an unworn state of the earphone, wherein when the earphone is in the worn state the earphone is operated in a normal operating mode, wherein when the earphone is in the unworn state the earphone is operated in a low power consumption mode in order to reduce power consumption of the earphone as compared to the normal operating mode, wherein the first event comprises a movement event of fastening to an ear and adjusting, and wherein the second event at least comprises a movement event caused by a hand leaving the earphone.

2. The method as claimed in claim 1, wherein:

determining that the earphone has experienced the first event comprises comparing the first acceleration data from the earphone with a predetermined acceleration data mode corresponding to the first event; and determining whether the earphone has experienced the second event comprises comparing the first angular velocity data from the earphone with a predetermined angular velocity data mode corresponding to the second event.

3. The method as claimed in claim 1, wherein the second event further comprises at least one event selected from a group of events consisting of a movement from picking up the earphone to aligning with the ear, a movement of approaching the ear, the movement of fastening to the ear and adjusting, a movement of unfastening from the ear, a movement of leaving the ear, and a movement of rotating an arm and putting down the earphone.

4. The method as claimed in claim 1, further comprising:

in response to the determined first event, determining whether the earphone has experienced a third event based on second acceleration data from the earphone, wherein determining the wearing state of the earphone further comprises determining the wearing state of the earphone based on a determination result for the third event.

5. The method as claimed in claim 4, further comprising:

determining whether the earphone has experienced a fourth event based on second angular velocity data from the earphone in response to the second event, wherein determining the wearing state of the earphone further comprises determining the wearing state of the earphone based on a determination result for the fourth event.

6. The method as claimed in claim 4, wherein the third event comprises at least one event selected from a group of events consisting of a movement from picking up the earphone to aligning with the ear, a movement of approaching the ear, the movement of fastening to the ear and adjusting, the movement caused by the hand leaving the earphone, a movement of unfastening from the ear, a movement of the earphone leaving the ear, and a movement of rotating an arm and putting down the earphone.

7. The method as claimed in claim 6, wherein:

the second event and the third event comprise a movement event from picking up the earphone to aligning with the ear;

determining whether the earphone has experienced the second event comprises comparing the first angular velocity data with a predetermined angular velocity data mode corresponding to the movement event from picking up the earphone to aligning with the ear;

determining whether the earphone has experienced the third event comprises comparing the second acceleration data with a predetermined acceleration data mode corresponding to the movement event from picking up the earphone to aligning with the ear; and determining the wearing state of the earphone further comprises, when it is determined that the earphone has experienced the second event and the third event, determining the wearing state of the earphone to be the worn state.

8. The method as claimed in claim 6, wherein:

the second event and the third event comprise a movement event of rotating the arm and putting down the earphone;

determining whether the earphone has experienced the second event comprises comparing the first angular velocity data with a predetermined angular velocity data mode corresponding to the movement event of rotating the arm and putting down the earphone;

determining whether the earphone has experienced the third event comprises comparing the second acceleration data with a predetermined acceleration data mode corresponding to the movement event of rotating the arm and putting down the earphone; and determining the wearing state of the earphone further comprises, when it is determined that the earphone has experienced the second event and the third event, determining the wearing state of the earphone to be the unworn state.

9. The method as claimed in claim 1, wherein:

determining that the earphone has experienced the first event comprises comparing the first acceleration data with a predetermined acceleration data mode corresponding to the movement event of fastening to the ear and adjusting;

determining whether the earphone has experienced the second event comprises comparing the first angular velocity data with a predetermined angular velocity data mode corresponding to the movement event caused by the hand leaving the earphone; and determining the wearing state of the earphone further comprises, when it is determined that the earphone has experienced the second event, determining the wearing state of the earphone to be the worn state.

10. The method as claimed in claim 1, further comprising:

in response to the first event and/or the second event, receiving proximity data from a proximity sensor of the earphone, wherein determining the wearing state of the earphone further comprises determining the wearing state of the earphone based on the proximity data.

11. A device for determining a wearing state of an earphone, comprising:

a non-transitory machine readable storage medium, storing a computer program instruction; and a processing unit operably connected to the non-transitory machine readable storage medium, the processing unit configured to execute the stored computer program instruction to:

determine that the earphone has experienced a first event based on first acceleration data acquired from the earphone, in response to the determined first event, determine whether the earphone has experienced a second event based on first angular velocity data acquired from the earphone, and determine the wearing state of the earphone based on a determination result for the two events, wherein the wearing state includes a worn state of the earphone and an unworn state of the earphone, wherein when the earphone is in the worn state the processing unit is configured to operate the earphone in a normal operating mode, wherein when the earphone is in the unworn state the processing unit is configured to operate the earphone in low power consumption mode in order to reduce power consumption of the earphone as compared to the normal operating mode, wherein the first event comprises a movement event of fastening to an ear and adjusting, and wherein the second event at least comprises a movement event caused by a hand leaving the earphone.

12. An earphone, comprising:

an acceleration sensor configured to collect acceleration data of the earphone;

an angular velocity sensor configured to selectively collect angular velocity data of the earphone; and a device configured to determine a wearing state of the earphone, the device comprising:

a non-transitory machine readable storage medium, storing a computer program instruction; and a processing unit operably connected to the non-transitory machine-readable storage unit and configured to execute the stored computer program instruction to:

determine that the earphone has experienced a first event based on the collected acceleration data, in response to the determined first event, determine whether the earphone has experienced a second event based on the collected angular velocity data, and determine the wearing state of the earphone based on a determination result for the two events, wherein the wearing state includes a worn state of the earphone and an unworn state of the earphone, wherein when the earphone is in the worn state the earphone is operated in a normal operating mode, wherein when the earphone is in the unworn state the earphone is operated in low power consumption mode in order to reduce power consumption of the earphone as compared to the normal operating mode, wherein the first event comprises a movement event of fastening to an ear and adjusting, and wherein the second event at least comprises a movement event caused by a hand leaving the earphone.

13. The earphone as claimed in claim 12, further comprising:

a control unit configured to activate the angular velocity sensor to selectively collect the angular velocity data of the earphone in response to the determined first event.

* * * * *